(12) United States Patent
Pereira et al.

(10) Patent No.: US 9,038,363 B2
(45) Date of Patent: May 26, 2015

(54) ELECTRIC DE-ICING DEVICE AND RELATED MONITORING SYSTEM

(75) Inventors: David Pereira, Limours (FR); Laurence Lemains, St. Laurent de Brevedent (FR)

(73) Assignee: AIRCELLE, Gonfreville l'Orcher (FR)

( * ) Notice: Subject to any disclaimer, the term of this patent is extended or adjusted under 35 U.S.C. 154(b) by 794 days.

(21) Appl. No.: 13/145,601

(22) PCT Filed: Jan. 20, 2010

(86) PCT No.: PCT/FR2010/000053
§ 371 (c)(1),
(2), (4) Date: Jul. 21, 2011

(87) PCT Pub. No.: WO2010/086524
PCT Pub. Date: Aug. 5, 2010

(65) Prior Publication Data
US 2011/0277443 A1  Nov. 17, 2011

(30) Foreign Application Priority Data

Jan. 28, 2009  (FR) ..................... 09 00364

(51) Int. Cl.
| B64D 15/12 | (2006.01) |
| B64D 15/00 | (2006.01) |
| F02C 7/047 | (2006.01) |
| B64D 15/20 | (2006.01) |
| H05B 3/00  | (2006.01) |
(Continued)

(52) U.S. Cl.
CPC ............... B64D 15/12 (2013.01); B64D 15/20 (2013.01); F02C 7/047 (2013.01); H05B 3/0014 (2013.01); B64D 15/00 (2013.01); H05B 3/026 (2013.01); B64D 2033/0233 (2013.01)

(58) Field of Classification Search
CPC .................. B64D 15/00; B64D 15/12; B64D 2033/0233; B64D 15/20; F02C 7/047; H05B 3/0014; H05B 3/026
USPC ................. 60/39.093, 779; 244/134 R, 134 D
See application file for complete search history.

(56) References Cited

U.S. PATENT DOCUMENTS

| 4,638,960 A | * | 1/1987 | Straube et al. ............ 244/134 D |
| 5,344,696 A | * | 9/1994 | Hastings et al. ............. 428/220 |
| 6,129,314 A | * | 10/2000 | Giamati et al. ........... 244/134 R |
(Continued)

FOREIGN PATENT DOCUMENTS

| EP | 0164838 A1 | 12/1885 |
| EP | 0105410 A1 | 4/1984 |
(Continued)

OTHER PUBLICATIONS

International Search Report PCT/FR2010/000053; Dated May 17, 2010.

*Primary Examiner* — William H Rodriguez
*Assistant Examiner* — Carlos A Rivera
(74) *Attorney, Agent, or Firm* — Brinks Gilson & Lione

(57) ABSTRACT

The invention relates to a de-icing device for an element of a nacelle of a turbojet engine, including at least one heating resistant mat connected to at least one electrical power source (3) and thus defining an assembly (1) of resistant mats, characterized in that the assembly of resistant mats includes one or more subassemblies of resistant mats, each subassembly in turn including one or more resistant mats of the assembly, and each subassembly of resistive mats having a different ohmic value.

13 Claims, 4 Drawing Sheets

(51) Int. Cl.
*H05B 3/02* (2006.01)
*B64D 33/02* (2006.01)

(56) References Cited

U.S. PATENT DOCUMENTS

| | | | | |
|---|---|---|---|---|
| 6,384,611 | B1 * | 5/2002 | Wallace et al. | 324/671 |
| 6,753,513 | B2 * | 6/2004 | Goldberg et al. | 219/497 |
| 6,879,168 | B2 * | 4/2005 | Baas et al. | 324/671 |
| 6,906,537 | B2 * | 6/2005 | Goldberg et al. | 324/721 |
| 8,049,147 | B2 * | 11/2011 | Hogate | 219/544 |
| 2006/0226292 | A1 * | 10/2006 | Houlihan et al. | 244/134 R |
| 2007/0210073 | A1 * | 9/2007 | Hubert et al. | 219/535 |
| 2008/0111028 | A1 | 5/2008 | Kumar | |
| 2008/0179448 | A1 * | 7/2008 | Layland et al. | 244/1 N |

FOREIGN PATENT DOCUMENTS

| | | |
|---|---|---|
| GB | 1247071 | 9/1971 |
| GB | 2450503 A | 12/2008 |

\* cited by examiner

ELECTRIC DE-ICING DEVICE AND RELATED MONITORING SYSTEM

TECHNICAL FIELD

The present invention relates to a deicing method, in particular for an air intake lip assembly of a turbojet engine nacelle.

BACKGROUND

An airplane is propelled by one or more propulsion assemblies each comprising a turbojet engine housed in a tubular nacelle. Each propulsion assembly is attached to the airplane by a pylon generally located under a wing or at the fuselage.

A nacelle generally has a structure comprising an air intake upstream of the engine, a central section intended to surround a fan of the turbojet engine, a downstream section housing thrust reverser means and intended to surround the combustion chamber of the turbojet engine, and generally ends with a jet nozzle whereof the outlet is located downstream of the turbojet engine.

The air intake comprises, on one hand, an air intake lip suitable for allowing optimal collection towards the turbojet engine of the air needed to supply the fan and internal compressors of the turbojet engine, and on the other hand, a downstream structure on which the lip is attached and intended to suitably channel the air towards the blades of the fan. The assembly is attached upstream of the fan casing belonging to the upstream section of the nacelle.

In flight, depending on the temperature and humidity conditions, ice may form on the nacelle, in particular at the outer surface of the air intake lip. The presence of ice or frost alters the aerodynamic properties of the air intake and disrupts the conveyance of air towards the fan. Furthermore, the formation of ice on the air intake of the nacelle and the ingestion of ice by the engine in the event blocks of ice detach can damage the engine, and present a safety risk for the flight.

One solution for defrosting or deicing the outer surface consists of preventing ice from forming on that outer surface by keeping the concerned surface at a sufficient temperature.

Thus, it is known, for example from document U.S. Pat. No. 4,688,757, to take hot air at the turbojet engine compressor and convey it to the air intake lip to heat the walls. However, such a device requires a system of hot air intake pipes between the turbojet engine and the air intake, as well as a system for evacuating hot air at the air intake lip. This increases the mass of the propulsion assembly, which is not desirable.

These drawbacks were able to be offset by using electrical deicing systems.

EP 1 495 963 and a number of other documents relate to electrical deicing and its developments.

In order to lighten the structures used in the composition of nacelles, and more generally, aeronautic equipment, as much as possible, composite materials are used more and more in these structures. The air intake lip of a nacelle can in particular be made from composite materials.

The use of these materials poses certain problems in the context of an electrical deicing device.

Indeed, the exposure temperature of these materials generally must not exceed a critical threshold, subject to distorting the material and therefore damaging the structure. The temperature of the composite material should therefore be monitored so as to avoid any overheating, in particular locally, of the material.

One obvious solution is to equip the structure made from composite material with temperature sensors, typically at least one temperature sensor per heating mat incorporated into the air intake of the nacelle, the air intake having a significant number of heating mats. However, such a solution does not make it possible to avoid certain local overheating between the sensors without substantially increasing the number of temperature sensors used. Such a solution also involves establishing a data transfer network for the data measured by the sensor, which makes the structure heavier and can make the deicing device particularly complex and not very practical in terms of its installation and implementation.

For reliability reasons, it could also be necessary to make the sensors redundant, which would further affect the mass of the structure and increase the complexity thereof.

French application Ser. No. 08/06416 in the applicant's name aims to offset these drawbacks and to do so, referred to a deicing system related to a central control unit of the aircraft (FADEC) so as to obtain information on the outside flight conditions and adapt the deicing power accordingly.

Moreover, combining the electrical power supply and measurement chains for a plurality of resistant mats creates a new problem, i.e. monitoring the integrity of the heating mats.

BRIEF SUMMARY

The invention provides a de-icing device for an element of a nacelle of a turbojet engine, including at least one heating resistant mat connected to at least one electrical power source and thus defining an assembly of resistant mats, characterized in that the assembly of resistant mats includes one or more subassemblies of resistant mats, each subassembly in turn including one or more resistant mats of the assembly, and each subassembly of resistant mats having a different ohmic value.

Thus, by providing subassemblies of heating mats having different ohmic values, it is possible, by measurement or calculation of the ohmic value of the assembly, to determine whether this ohmic value of the assembly corresponds to the nominal ohmic value, and therefore that all of the resistant mats are operational, or whether the ohmic value of the assembly is different, in which case this means that at least one subassembly is faulty.

Each resistant mat subassembly having a different ohmic value, the ohmic value measured for the assembly makes it possible to identify the faulty mat(s).

Of course, each resistant mat can form a subassembly, but due to the symmetry factor of a nacelle, it is for example possible to have two or more mats, each having a substantially identical ohmic value and therefore together forming an identifiable subassembly, the faulty mat not, however, being able to be identified inside said subassembly.

Preferably, the power source is a three-phase dedicated generator, in particular according to a system as described in EP 1 953 085, integrated into the electrical deicing system of the air intake of the nacelle. Such a solution makes it possible to directly connect the heating mats on said generator without adding an additional energy conversion stage. This conversion stage offsets the normal voltage variations on the three-phase power network of the aircraft. Indeed, the output voltage of the dedicated generator is imposed by an excitation current unique to the system and does not undergo the stresses of the airplane electrical grid and can be adapted as needed. Alternatively, the power source can be the electrical power grid of the aircraft including an additional energy conversion stage.

Advantageously, the deicing device comprises several resistant mat assemblies.

Preferably, the element of the nacelle is an air intake lip.

Advantageously, the deicing device has at least one temperature sensor situated inside the air intake lip at the end thereof, making it possible to best monitor the lip and adapt the power to be supplied to the heating mats appropriately.

This positioning of the sensors makes it possible to reduce the number of sensors. The thermal models show that positioning a temperature sensor inside the end of the lip guarantees the complete monitoring of the air intake. Thus, the architecture thereof is simplified and reliability is improved.

In this way, the temperature can be controlled only inside the end of the lip and the power to be supplied to the heating mats is regulated by these temperature measurement(s) by comparing them to a threshold value. The location of the sensor(s) as well as these threshold value(s) are determined by analysis so as to eliminate overheating on the air intake assembly.

Preferably, the device comprises means for measuring the voltage value and intensity of the current circulating in the resistant mat assembly.

Advantageously, the deicing device comprises a computer able to start from the value of the voltage and intensity of the current circulating in the resistant mat assembly to compute an effective equivalent resistance value of said assembly and compare said obtained effective equivalent resistance to at least one set of equivalent resistance values computed for different cases of failure of at least one mat subassembly so as to determine the faulty mat subassembly or subassemblies in case of deviation above a predetermined value taking into account machining allowances and measurement imprecisions in particular.

Also advantageously, the effective equivalent resistance value is also compared to a nominal equivalent resistance value of the assembly.

Such an onboard computer therefore makes it possible to take measurements continuously or discretely regularly, even during flight, without additional measuring tools.

Advantageously, the deicing device comprises at least one computer comprising, on one hand, at least one means for receiving at least one data representative of the external flight conditions from a central control unit, and on the other hand, electrical power means for the resistant mats regulated as a function of the obtained representative data.

More specifically, the deicing device can be associated with a device for implementing the method described and claimed in the aforementioned French application Ser. No. 08/06,416.

This device could of course implement the complementary steps claimed in that application, i.e.:
  determining a thermal model for the structure to be deiced corresponding to the obtained flight conditions, and as a function of the thermal model, delivering the appropriate corresponding electrical power to the heating resistance,
  the parameters representative of the outside flight conditions are obtained via at least one data connection using an ARINC bus, the connection preferably being redundant,
  the parameters representative of the outside flight conditions comprise at least one of the following parameters: outside temperature, outside pressure, speed of the airplane, humidity level.
  the computer is able to deliver, to each mat assembly, a unique electrical power, different or not, as a function of the chosen thermal model and the location of the mats.
  the method carried out comprises a loop for regulating the electrical power supplied to the heating resistances as a function of the power dissipated by said heating resistances.
  when a thermal model corresponding to a non-icing flight envelope is applied, the heating resistances are not supplied, allowing a gain in terms of electrical consumption.
  the device can be associated with an ice detector.

The present invention also relates to a method for monitoring the integrity of resistant mats of a deicing device according to the invention, comprising the following steps aiming to:
  obtain nominal equivalent resistance values for each set of resistant mats from nominal ohmic values of each mat.
  obtain a set of equivalent resistance values for each set of mats and in which at least one resistant mat subassembly is faulty.
  measure the intensity of the current circulating in each resistant mat assembly,
  measure the value of the output voltage in each resistant mat assembly,
  compute the real resistance of the resistant assembly from intensity and voltage measurements,
  compare the obtained real resistance with the nominal resistance of the assembly and/or with the equivalent resistances in the case of failure to determine, to within a tolerance value, whether the resistant assembly is operating normally or which resistive mat(s) has (have) failed.

According to a first alternative embodiment, the nominal and equivalent resistance values are stored in a memory.

According to a second embodiment, the nominal and equivalent resistance values are computed from stored ohmic values of the resistant mats or mat subassemblies.

The invention also relates to a method for monitoring the integrity of an assembly of resistant mats of a deicing device according to the invention comprising the following steps aiming to:
  Measure the intensity of the current circulating in each assembly of resistant mats,
  measure the value of the output voltage in each resistant mat assembly,
  compare the obtained intensity and voltage values to the intensity and voltage values obtained during a previous measurement.

In this case, the monitoring of the integrity of the heating mats is done through successive measurements of the currents and voltages. Each measurement is compared to the one before it. Measurement variations are in fact minimal when the mats are whole. Variation can only occur in the event of the loss of a heating mat. Advantageously, this type of measurement makes it possible to eliminate the uncertainties of different measurement chains.

Advantageously, in the event a failure is detected, the computer orders the resistant mats to transition into a deteriorated heating mode.

This deteriorated mode corresponds to the sending of a warning message to the pilot to warn him to leave the icing conditions as soon as possible. And depending on the scenario, it is possible either to decrease the power to avoid overheating the lip, or to maintain the deicing power to protect the engine from ice.

BRIEF DESCRIPTION OF THE DRAWINGS

The present invention will be better understood in light of the following detailed description, relative to the appended drawing, in which.

DETAILED DESCRIPTION

Figure 1:
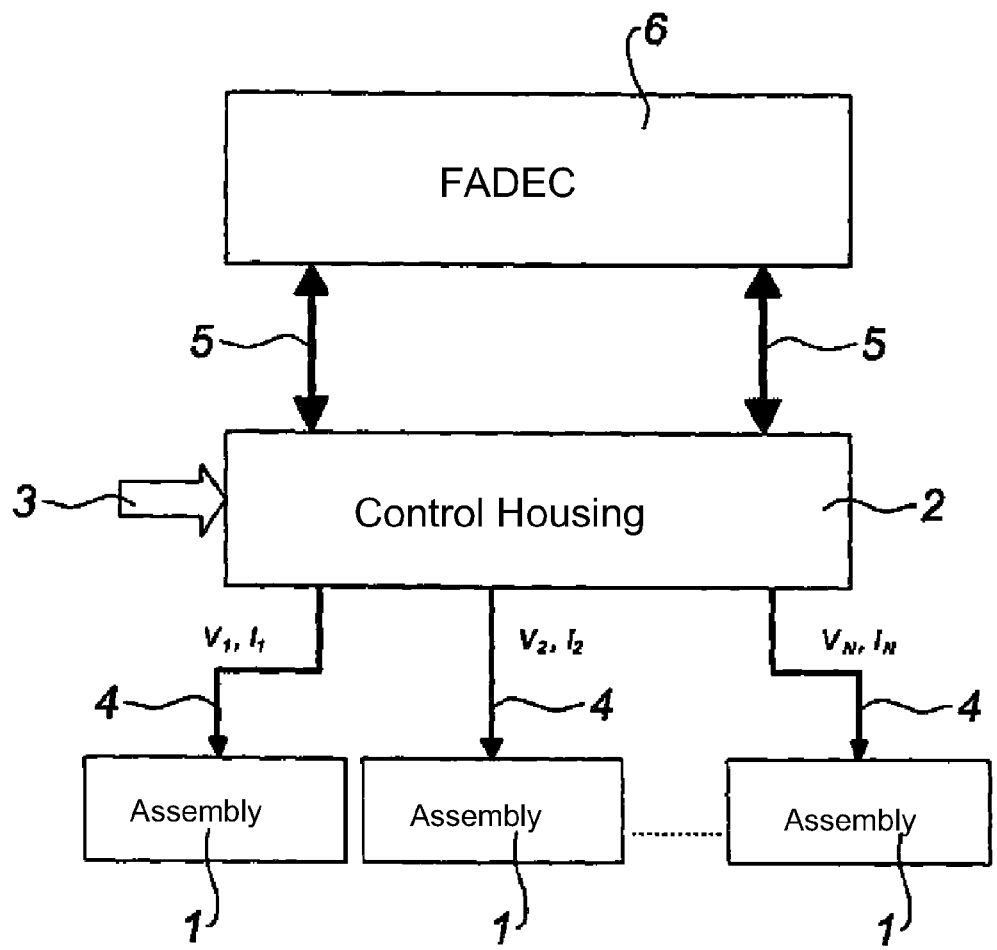
FIG. 1 is a diagrammatic illustration of a control device of an electric deicing system according to the invention.
Figure 2:
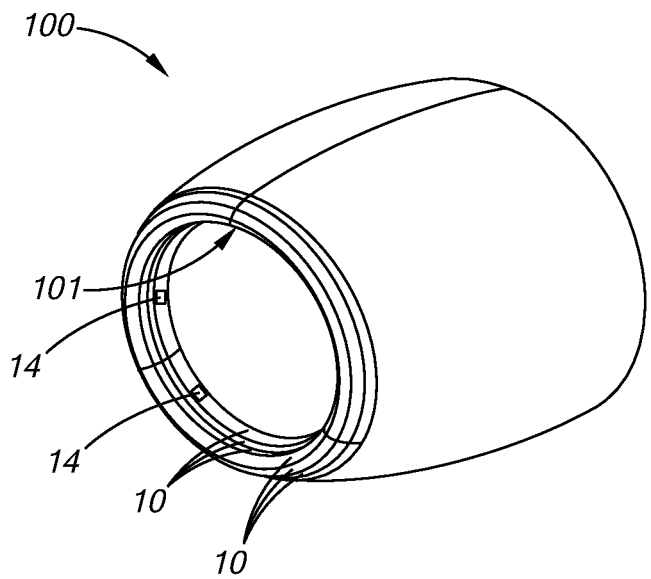
FIG. 2 is a diagrammatic illustration of an air intake of a turbojet engine nacelle equipped with a deicing device on an air intake lip.

FIG. 1 diagrams a control device of an electric deicing system of an air intake of a turbojet engine nacelle as shown in FIG. 2.

This air intake 100 is equipped with a plurality of heating resistances grouped together in heating resistant mats 10 grouped together in assemblies 1 of resistant mats 10.

Advantageously, each assembly 1 of resistant mats 10 corresponds to a specific zone of an air intake lip 101.

In the illustrated scenario, the air intake 101 is divided into six peripheral zones and six sectors and therefore includes thirty-six resistant mats 10.

The six resistant mats 10 of the peripheral zones form an assembly 1 of resistant mats over two sectors. There are therefore three assemblies 1 of twelve resistant mats 10.

The three assemblies 1 of resistant mats 12 respectively correspond to a zone situated near the inside (Int) of the air intake lip 101, a zone situated at the air intake lip 101, and a zone situated slightly upstream of the air intake lip 101.

In fact, these different zones of the air intake lip can, although subjected to the same external conditions, have different needs in terms of required deicing power.

It should be noted that there are generally at least two electrical power alternatives: either the grid 3 is the three-phase grid of the airplane, the behavior of which is illustrated by the following paragraph, or the grid 3 is a dedicated grid, in which case there is no need for switches (the switch can be left as an architectural possibility), but there is no longer a need for an energy conversion stage, and it is the adjustable voltage of the dedicated generator that is applied to the heating mats.

The control device comprises a control housing 2 powered by a 115 Volt or 230 Volt variable frequency alternating three-phase grid 3, for example, the control housing 2 in turn being able to electrically power the mats 1 of heating resistances via electrical outputs 4 by converting the alternating or direct supply voltage into a direct and regulated supply voltage for each mat 1. Each power outlet 4 is equipped with a control switch (not shown) that, for safety reasons, can be redundant.

Of course, depending on the needs, the output voltage could also be alternating.

Each electrical outlet 4 is dedicated and powers one mat. Each mat 1 can therefore be powered by a unique electrical voltage depending on the electrical power needed to deice the air intake lip zone covered by said mat 1.

The control housing 2 can also measure the current consumed by each heating mat 1. The power dissipated by each heating element is therefore determined fairly easily by the control housing 2 without using any temperature sensor.

However, a temperature sensor (not shown) is provided for each assembly 1 of resistant mats 10.

As for the switches, for safety reasons, the temperature sensors may be redundant.

According to the inventive method, the control housing 2 uses information on the outside flight conditions available from the FADEC 6. The exchange of data between the control housing 2 and the FADEC 6 is ensured by a redundant ARINC bus connection 5.

The interest of using the FADEC to obtain this data is that all of the information concerning the flight conditions is already available and reliabilized.

The control housing 2 therefore uses the information from the FADEC and temperature sensors 14 to determine the electrical power to be supplied to the heating resistance mats 1 according to the flight scenario and outside conditions, and maintains that power from current and voltage measurements done by that same control housing 2.

On a traditional flight, it is in particular possible to distinguish the following flight situations: takeoff, climb, cruising, descent, wait prior to landing, plane on ground.

Figure 3:
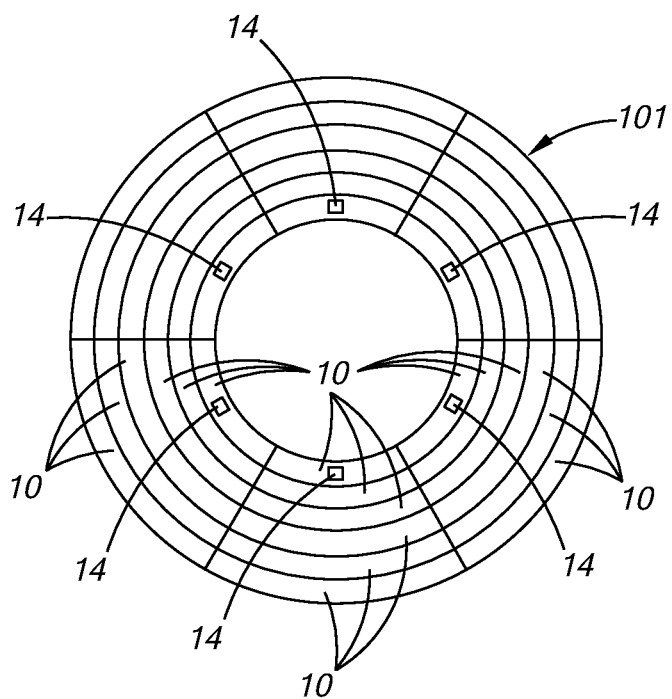
FIG. 3 is a diagrammatic projection of the distribution of the heating mats on the circumference of the air intake lip.

The control housing 2 typically uses the flight parameters sent by the FADEC so as to define whether the flight field corresponds to a deicing field. In particular, if the total flight temperature is strictly above 2° C. or if the altitude is higher than 35,000 feet, the mats 10 are not powered. If the airplane is in the icing field shown by FIGS. 2 and 3, the power to be supplied to the heating mats depends on the flight phase.

This type of control allows a substantial reduction of energy consumption compared to existing pneumatic solutions. There is no pointless overheating of the lip, which is an undeniable advantage for the structure in terms of strength of the materials and aging.

From the existing thermal models, it is possible to determine the electrical power necessary for deicing for each mat 1 of heating resistances.

Of course, the values can be difference for each assembly 1 of resistant mats 10.

From information obtained from the FADEC 6, the control housing 2 determines whether the airplane is evolving in an icing envelope, and determines the applicable thermal model, and therefore the electrical power to be supplied to the heating mats 10 determined by that model.

Unlike the airplane electrical grid that provides a predefined voltage in a caliber in compliance with the aeronautic standards, the fact that the deicing device has its own electrical power 3, makes it possible to supply a voltage regulated at the specified instruction.

The deicing systems connected to the airplane electrical grid must take into consideration all of the requirements of aeronautic standards and adapt the power supplied to the different resistant mats 10 by regulating the power via the switches.

In a system according to the invention and as described, having a dedicated electrical grid allows the switches to operate in all or nothing, which simplifies the driving and reliability law (see preceding comment on the different possible electrical sources).

The temperature sensors 14 aim to ensure that the temperature of the skin of the air intake lip 101 corresponds to the command.

If a surplus of power is sent to the resistant mats 10, if the system is activated when the outside conditions are not icing, if the power supplied can cause a risk of overheating, or if the power prediction relative to the flight scenario is not compliant (underdimensioned or overdimensioned), a strategy based on receiving data from the FADEC 6 and on the temperature sensors 14 makes it possible to adjust the powers supplied to the different assemblies 1 of resistant mats 10.

Figure 4:
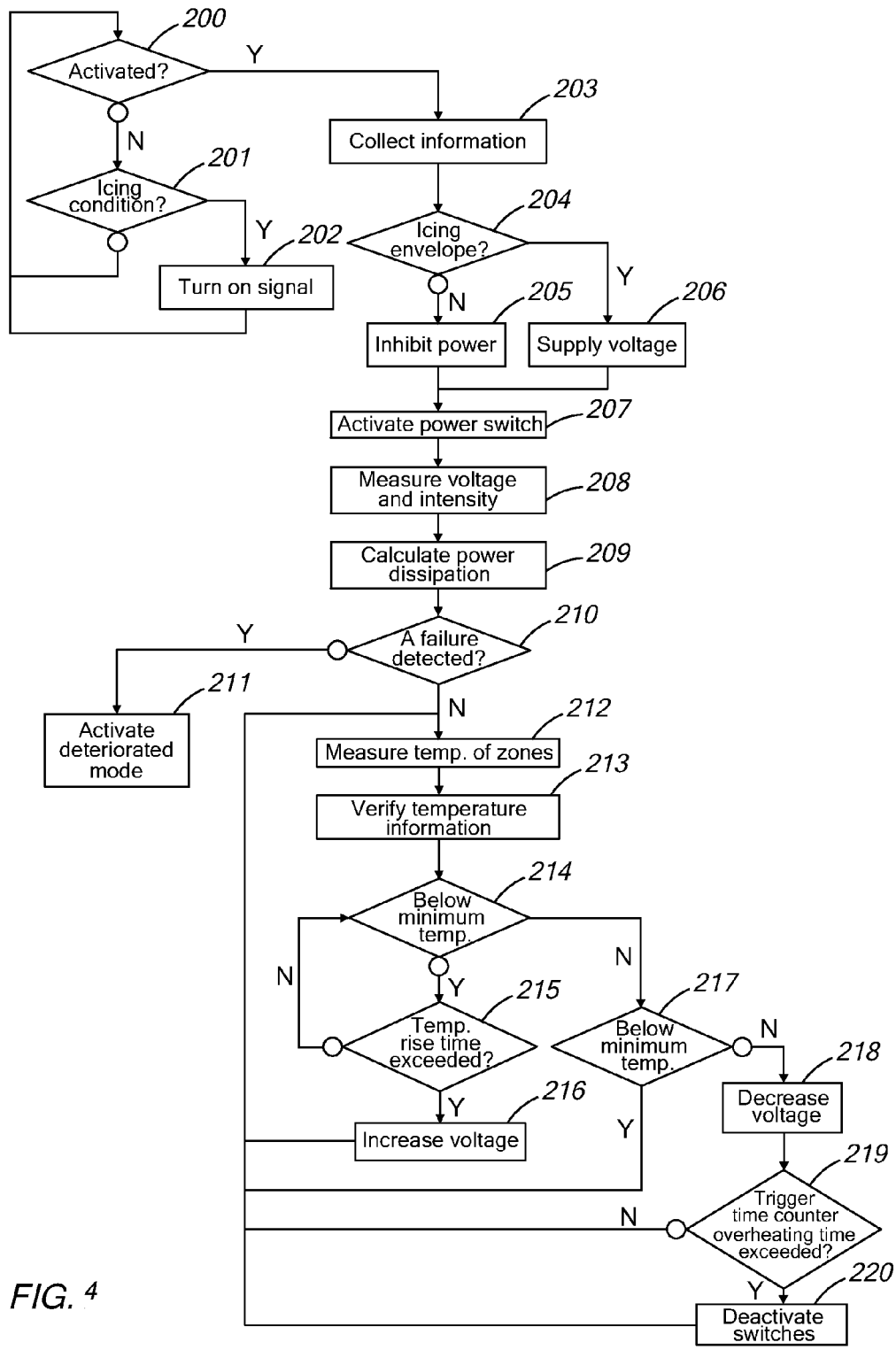
FIG. 4 is a flowchart showing the steps of a method according to the invention.

FIG. 4 is a flowchart of an example of steps in such a deicing method.

The method comprises a first step 200 aiming to test whether the deicing system was activated by the pilot.

In the event the pilot has not activated the system, the method comprises a loop including a test step 201 verifying whether the ice detector or the FADEC has detected icing outside conditions.

If icing conditions are detected, the method comprises a step 202 for notifying the pilot by a sound and/or light signal on the dashboard, for example.

When the system is activated by the pilot, the method comprises a step 203 for querying the FADEC during which it collects information on the outside conditions such as temperature, pressure, and altitude.

From that information, the system determines, during a step 204, a corresponding thermal model and whether the airplane is evolving in an icing envelope.

If an icing envelope is detected, the system loads 205 the corresponding supply voltages of the different assemblies 1 of resistant mats 10 (example table 1).

If no icing envelope is detected, the system inhibits 206 the power to the heating mats 10.

The power switches are activated 207 to deliver the supply voltages thus defined to the resistant mats 10.

The system then measures, continuously or discretely, the power voltages and intensities during a step 208.

From these measurements, the system calculates, during a step 209, the power dissipated by each assembly 1 of resistant mats 10.

The following step 210 aims to verify the integrity of the heating mats 10 and will be described in more detail later in reference to FIG. 5.

If a failure of at least one resistive mat 10 is detected, the system activates 211 a heating mode taking into account the so-called deteriorated mode.

If no failure is detected, the system measures 212 the temperatures of the zones of each assembly 1 of resistive mats 10.

A step 213 verifies and validates this temperature information relative to given specifications and standards.

A step 214 verifies whether the returned temperatures are above a minimum temperature value to be reached for each assembly 1 of resistant mats 10.

If this temperature is not reached, the system provides a regulation loop. This loop comprises a first step 215 verifying whether the set temperature rise time has been exceeded. If this time has been exceeded, then the power voltage of the assembly 1 is increased (order 216). If not, the time is left to the system.

When the temperature is above the minimum set temperature, the system verifies 217 whether the temperature remains below the maximum set temperature.

If yes, the system does nothing, and the regulation and control loop resumes. If the maximum temperature is reached, an order 218 commands a decrease in the supply voltage of the concerned assembly 1 of resistant mats 10 (or the assemblies 1).

When it is detected that the maximum set temperature has been exceeded, a time counter is triggered and a step 219 verifies whether the overheating time for the materials has been exceeded. In the event the overheating time is exceeded, and therefore the materials making up the air intake 100 are likely to have been damaged, the switches are deactivated (order 220) or the voltage of the generatrix is set at 0 V in the case of a dedicated electrical grid.

Figure 5:
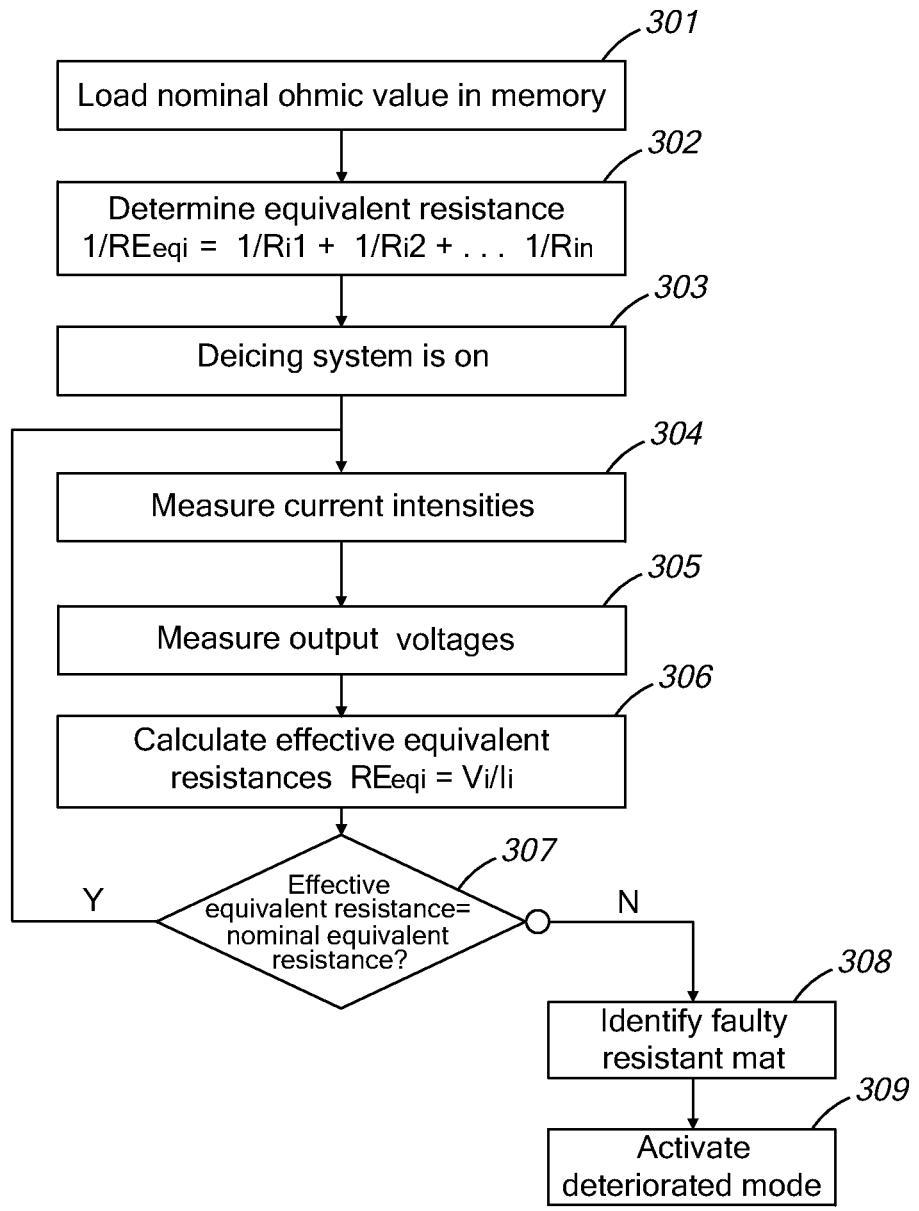
FIG. 5 is a flowchart showing the step for diagnosing the operation of the heating mats.

It is now appropriate to describe the sub-process of verifying the integrity of the resistant mats 10, an example of which is shown in FIG. 5.

A first step 301 comprises loading the nominal ohmic values of the thirty-six resistant mats 10 in memory into the computer.

A second step 302 aims to define a table of equivalent resistances for each assembly 1 of resistant mats 10, i.e.:

values of the nominal equivalent resistance of each assembly 1. The resistant mats 10 of the assembly being mounted in a parallel circuit, the following classic rule will be applied:

$$1/REeqi = 1/Ri1 + 1/Ri2 + \ldots + 1/Rin$$

Where REeqi is the equivalent resistance of the assembly i, Ri1 to Rin being the values of resistances of the n heating mats 10 belonging to the assembly i.

Equivalent resistance values for these same assemblies 1, in cases of failure, in particular the equivalent resistance value for each combination of one or two faulty resistant mats 10.

When the deicing system is on (303), a control loop is implemented.

This loop comprises a step 304 for measuring the current intensities passing through each assembly 1 as well as a step 305 for measuring the output voltages of switches of each assembly 1.

From these measurements or values, the computer then proceeds with a step 306 for calculating effective equivalent resistances of each assembly 1 by applying the classic formula $REeqi = Vi/Ii$.

A test step 307 then determines whether the obtained effective equivalent resistance values are equal to the nominal equivalent resistance values, of course taking into account a tolerance margin taking into account measurement and machining allowances, in particular.

If no failure is detected, the control loop repeats.

In case of deviation in the equivalent resistance values, a comparison with the values stored in the table of equivalent resistances makes it possible to determine what failure the effective equivalent resistance value that is different from the nominal value corresponds to during a step 308, which therefore makes it possible to identify the faulty resistant mat(s).

The system then activates a deteriorated heating mode, through an order 309.

Although the invention has been described in relation to a particular embodiment, it is of course in no way limited to that description and encompasses all technical equivalents of the means described as well as their combinations if they are within the scope of the invention.

The invention claimed is:

1. A de-icing device for an element of a nacelle of a turbojet engine, including at least one heating resistant mat connected to at least one electrical power source and thus defining an assembly of heating resistant mats, wherein the heating resistant mats of the assembly are mounted in parallel, and wherein the assembly of heating resistant mats includes one or more subassemblies of heating resistant mats, each subassembly in turn including one or more heating resistant mats of the assembly, and each subassembly of heating resistant mats having, at least when the heating resistant mats are operational, a different nominal ohmic value.

2. The deicing device according to claim 1, further comprising several heating resistant mat assemblies.

3. The deicing device according to claim 1, wherein the element of the nacelle is an air intake lip.

4. The deicing device according to claim 3, further comprising at least one temperature sensor situated inside the air intake lip at an end thereof, making it possible to best monitor the air intake lip and adapt power to be supplied to the heating resistant mats appropriately.

5. The device according to claim 1, further comprising means for measuring voltage value and intensity of current circulating in the heating resistant mat assembly.

6. The deicing device according to claim 1, further comprising at least one computer comprising at least one means for receiving at least one data representative of external flight conditions from a central control unit and electrical power means for the heating resistant mats regulated as a function of the obtained representative data.

7. A method for monitoring integrity of an assembly of heating resistant mats of the deicing device according to claim 1, comprising:
obtaining nominal equivalent resistance values for each set of heating resistant mats from the nominal ohmic value of each heating resistant mat,
obtaining a set of equivalent resistance values for each set of heating resistant mats from nominal ohmic values of each heating resistant mat and in which at least one heating resistant mat subassembly is faulty,
measuring intensity of current circulating in each heating resistant mat assembly,
measuring a value of an output voltage in each heating resistant mat assembly,
computing a real resistance of the heating resistant mat assembly from intensity and voltage measurements,
comparing the obtained real resistance with the nominal resistance values of the heating resistant mat assembly and/or with the equivalent resistance values in a case of failure to determine, to within a tolerance value, whether the heating resistant mat assembly is operating normally or which heating resistant mat failed.

8. The method according to claim 7, wherein the nominal and equivalent resistance values are stored in a memory.

9. The method according to claim 7, wherein the nominal and equivalent resistance values are computed from stored ohmic values of the heating resistant mats or mat subassemblies.

10. A method for monitoring integrity of an assembly of heating resistant mats of the deicing device according to claim 1 comprising:
measuring intensity of current circulating in each assembly of heating resistant mats,
measuring a value of output voltage in each heating resistant mat assembly,
comparing the obtained intensity and voltage values to the intensity and voltage values obtained during a previous measurement.

11. The method according to claim 7, wherein in an event a failure is detected, a computer orders the heating resistant mats to transition into a deteriorated heating mode.

12. The method according to claim 10, wherein in an event a failure is detected, the computer orders the heating resistant mats to transition into a deteriorated heating mode.

13. A de-icing device for an element of a nacelle of a turbojet engine, the de-icing device comprising:
at least one heating resistant mat connected to at least one electrical power source, the at least one heating resistant mat comprising an assembly of heating resistant mats mounted in parallel; and
means for measuring voltage value and intensity of current circulating in the heating resistant mat assembly,
wherein the assembly of heating resistant mats includes one or more subassemblies of heating resistant mats, each subassembly in turn including one or more heating resistant mats, and each subassembly of heating resistant mats having a different nominal ohmic value, and
wherein a computer of the deicing device is configured to start from the value of the voltage and intensity of the current circulating in the heating resistant mat assembly to compute an effective equivalent resistance value of said assembly of heating resistant mats and compare said obtained effective equivalent resistance value to at least one set of nominal equivalent resistance values computed for different cases of failure of at least one heating resistant mat subassembly so as to determine a faulty heating resistant mat subassembly or subassemblies in case of deviation above a predetermined value taking into account machining allowances and measurement imprecisions.

* * * * *